(12) United States Patent
Reiser

(10) Patent No.: US 10,599,726 B2
(45) Date of Patent: Mar. 24, 2020

(54) METHODS AND SYSTEMS FOR REAL-TIME UPDATING OF ENCODED SEARCH INDEXES

(71) Applicant: A9.com, Inc., Palo Alto, CA (US)

(72) Inventor: John Reiser, Portland, OR (US)

(73) Assignee: A9.COM, INC., Palo Alto, CA (US)

( * ) Notice: Subject to any disclaimer, the term of this patent is extended or adjusted under 35 U.S.C. 154(b) by 456 days.

(21) Appl. No.: 15/624,552

(22) Filed: Jun. 15, 2017

(65) Prior Publication Data

US 2018/0307758 A1 Oct. 25, 2018

Related U.S. Application Data

(63) Continuation-in-part of application No. 15/491,747, filed on Apr. 19, 2017, now abandoned.

(51) Int. Cl.

| | |
|---|---|
| *G06F 16/00* | (2019.01) |
| *G06F 16/951* | (2019.01) |
| *G06F 7/08* | (2006.01) |
| *G06F 9/30* | (2018.01) |
| *G06F 16/93* | (2019.01) |
| *G06F 16/901* | (2019.01) |

(52) U.S. Cl.
CPC ............ *G06F 16/951* (2019.01); *G06F 7/08* (2013.01); *G06F 9/3001* (2013.01); *G06F 9/3016* (2013.01); *G06F 9/30058* (2013.01); *G06F 16/901* (2019.01); *G06F 16/93* (2019.01)

(58) Field of Classification Search
CPC .......... G06F 16/951; G06F 16/93; G06F 7/08; G06F 9/3001; G06F 9/30058; G06F 9/3016; G06F 16/10; G06F 16/22; G06F 16/31; G06F 16/41; G06F 16/61; G06F 16/71; G06F 16/81; G06F 16/901; G06F 16/9537
See application file for complete search history.

(56) References Cited

U.S. PATENT DOCUMENTS

| | | | | |
|---|---|---|---|---|
| 6,546,385 | B1 * | 4/2003 | Mao | G06F 16/30 707/711 |
| 7,756,863 | B2 * | 7/2010 | Altevogt | G06F 16/951 707/722 |
| 2001/0054045 | A1 * | 12/2001 | Shirasaka | H04L 41/042 |
| 2005/0198076 | A1 * | 9/2005 | Stata | G06F 16/316 |

(Continued)

*Primary Examiner* — Noosha Arjomandi
(74) *Attorney, Agent, or Firm* — Hogan Lovells US LLP

(57) ABSTRACT

Embodiments described herein are directed to methods and systems for allowing real-time editing of posting lists encoded using variable-width byte encoding of document identifier deltas while maintaining scanning performance of a posting list. For example, embodiments are directed at determining a posting list associated with a query term and scanning the posting list for encoded document identifiers associated with the term. Embodiments may identify an interrupt indicator in the encoded document identifier and obtain modified document identifier information from an interrupt table. The modified document identifier information includes at least one encoded document identifier associated with a modified document associated with the query term. A set of decoded document identifiers including the term may be determined and search results including at least a subset of documents associated with the set of decoded document identifiers may be provided.

20 Claims, 8 Drawing Sheets

(56) References Cited

U.S. PATENT DOCUMENTS

| | | | | |
|---|---|---|---|---|
| 2011/0184933 A1* | 7/2011 | Colby | ............... | G06F 16/2456 |
| | | | | 707/714 |
| 2011/0202541 A1* | 8/2011 | Permandla | ............ | G06F 16/31 |
| | | | | 707/742 |
| 2012/0158731 A1* | 6/2012 | Gherman | ............. | G06F 16/93 |
| | | | | 707/741 |
| 2013/0262470 A1* | 10/2013 | Kusumura | ........... | G06F 16/319 |
| | | | | 707/742 |
| 2014/0074786 A1* | 3/2014 | Leggette | ............. | G06F 3/0689 |
| | | | | 707/638 |
| 2014/0164352 A1* | 6/2014 | Denninghoff | ........ | H03H 9/1092 |
| | | | | 707/711 |
| 2014/0351203 A1* | 11/2014 | Kunnatur | ............. | G06F 16/22 |
| | | | | 707/609 |
| 2015/0356169 A1* | 12/2015 | Popov | ............... | G06F 16/2272 |
| | | | | 707/742 |
| 2016/0378808 A1* | 12/2016 | Hopcroft | ........... | G06F 16/2237 |
| | | | | 707/745 |
| 2016/0378828 A1* | 12/2016 | Hopcroft | ............. | G06F 16/316 |
| | | | | 707/718 |
| 2017/0041296 A1* | 2/2017 | Ford | .................... | G06F 16/951 |
| 2018/0181094 A1* | 6/2018 | Funk | .................... | H04W 4/70 |

* cited by examiner

302

Term 1 Posting List — 300A

| DocID | 14 | 32 | 64 | 84 |
|---|---|---|---|---|
| Delta | | 18 | 32 | 20 |
| VBE | 10001110 | 10010010 | 10100000 | 10010100 |

Determine DocID 40 Added Term 1

Term 1 Posting List — 300B

| DocID | 14 | 32 | Interrupt Flag | 84 |
|---|---|---|---|---|
| Delta | | 18 | 0 | 20 |
| VBE | 10001110 | 10010010 | 00000000 | 10010100 |

Processor References Interrupt Table

306

Term 1 Interrupt Table — 300C

| 332 | Modification | Insert | |
|---|---|---|---|
| 334 | DocID | 40 | 64 |
| 336A | Modification Delta | 8 | |
| 336B | Resume Delta | | 24 |
| 338 | VBE | 10001000 | 10011000 |

Add Decoded Deltas to Identified Documents

300D 334A 334B

| DocID | 14  32  40  64  84 |
|---|---|

FIG. 3D

METHODS AND SYSTEMS FOR REAL-TIME UPDATING OF ENCODED SEARCH INDEXES

BACKGROUND

A typical search engine indexing algorithm utilizes an inverted index data structure. This is conceptually similar to the index in the back of a book; it is an index data structure mapping content, such as a list of words, to its location in a document (or set of documents). In the context of a search engine, the documents are commonly web pages, e-mail messages, and the like. The occurrence of a word in a document may be called a posting, and the list of all documents containing a word may be called a posting list. Just as a book index entry lists page numbers, a posting list may contain document identification numbers (DocIDs). When a search engine receives a query, it can look up the posting list for each word in the query and combine the results. In order to combine the results efficiently, the postings may be stored in order of their DocIDs.

It may be desirable to store posting lists in as little space as possible. By using the differences between adjacent DocIDs rather than the DocIDs themselves, the postings can contain smaller numbers. However, once a posting list has been generated and the differences between adjacent DocIDs are determined, it can be computationally costly to adjust or modify the sequence of DocIDs. Posting lists may not be readable while being updated and computational resources must be used to constantly update posting lists with updated deltas as documents are modified and subsequently are added or deleted from the posting list. Traditionally, additional posting lists may be generated to keep track of modifications to the original posting list. However, this requires two or more searches of posting lists for any term leading to more latency related to a search query. Accordingly, there is a need to improve the computational performance of incorporating modifications of documents in encoded posting lists.

BRIEF DESCRIPTION OF THE DRAWINGS

Various embodiments in accordance with the present disclosure will be described with reference to the drawings, in which:

FIGS. 3A-3D illustrates an exemplary process of performing real-time updating and reading of encoded posting lists for modified documents in accordance with various embodiments;

DETAILED DESCRIPTION

Figure 1A:
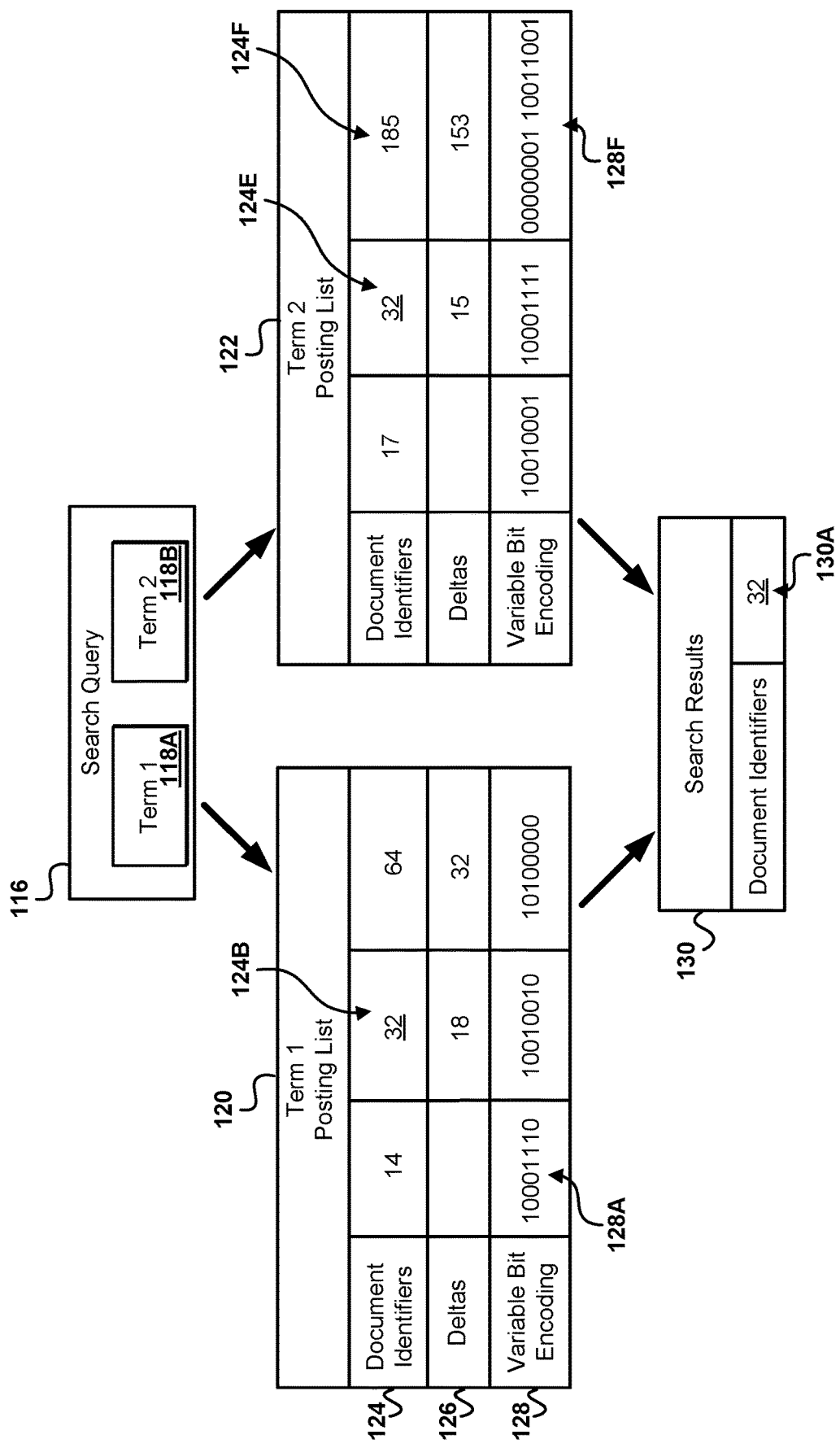
FIG. 1A-1B illustrate existing search processing using variable-width encoding of deltas in search processing systems in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to searching and editing search indexes and posting lists during processing of search queries. In particular, various embodiments are directed to allowing real-time editing of posting lists encoded using variable-width byte encoding of document identifier deltas while maintaining scanning performance of a posting list.

Methods, systems, and/or devices for encoding document identification numbers of a search engine posting list using interrupt indicators, markers, or flags are provided in accordance with various embodiments. For example, an embodiment is directed at determining a posting list associated with a query term and scanning the posting list for encoded document identifiers associated with the term. The encoded document identifiers may be encoded using variable-width byte encoding of document identifier deltas between adjacent document identifiers in the posting list. Embodiments identify an interrupt indicator in the encoded document identifier and obtain modified document identifier information from an interrupt table. The modified document identifier information includes at least one encoded document identifier associated with a modified document associated with the query term. A set of decoded document identifiers including the term may be determined and search results including at least a subset of documents associated with the set of decoded document identifiers may be provided.

Embodiments are configured to update posting lists in real-time or near real-time, while allowing simultaneous reading of the posting lists. Embodiments modify traversal algorithms of search engine decoders to recognize an interrupt signal (e.g., a redundant leading byte value of 0) embedded into the encoding of deltas in a posting list, and use the interrupt signal to designate alternate processing for modifications to the original posting list. Further, the method of detecting the redundant leading 0 takes care to have no additional cost for the cases where scanning does not encounter modifications (e.g., additions or deletions of modified documents). For example, embodiments implement an encoding process that uses an interrupt byte (e.g., leading byte value of 0) that includes a continuation bit (e.g., a redundant leading 0 in base 128 position notation) that indicates that although it appears the byte is instructing the system to accumulate additional bits for an encoded delta, the system uses the byte value to trigger an interrupt table lookup. Accordingly, embodiments encode an interrupt byte using a bit that can be processed without an additional cycle for the most common case (e.g., no continuation bit as each entry in the posting list is less than 127 document identifiers away from the previous document identifier). This allows the system to save a cycle in the most common scenario and process the posting lists more efficiently while allowing modifications to the posting list.

Accordingly, embodiments allow for variable-width byte encoded posting lists to be edited at runtime while maintaining performance for scanning to retrieve modified document numbers from an encoded vector array. Further, some embodiments may use idle processing resources of the processor performing the decoding of document identifiers to detect that the payload of a first byte of a variable byte encoded delta is equal to 0 at no cost in CPU cycles. Therefore, the leading encoded byte can be used as an "interrupt" signal to mark the location of insertion, deletion, non-consecutive continuation, or any other modification to the posting list. An interrupt table can be stored at one end of a block related to the current position in the encoded vector to allow parallel processing of the interrupt table. Accordingly, embodiments maintain the query logic and processing capabilities of decoding algorithms, while enabling updating of encoded posting lists that was previously too computing resource intensive.

Embodiments may provide numerous advantages including, but not limited to, improving the speed and latency of search requests. Additionally, posting lists may be re-generated or updated less often because the interrupt tables may include the modifications without causing significant delays in processing of search queries. As such, embodiments provide methods to speed up the editing of posting lists so that modifications can be performed to the posting lists in real-time without seriously affecting the latency of scanning and searching operations. Further, embodiments use the design of processor chips to perform the processing while leveraging idle processing units during decoding of the posting lists to ensure the modified document identifiers are obtained while minimizing the effect on search processing.

Figure 1B:
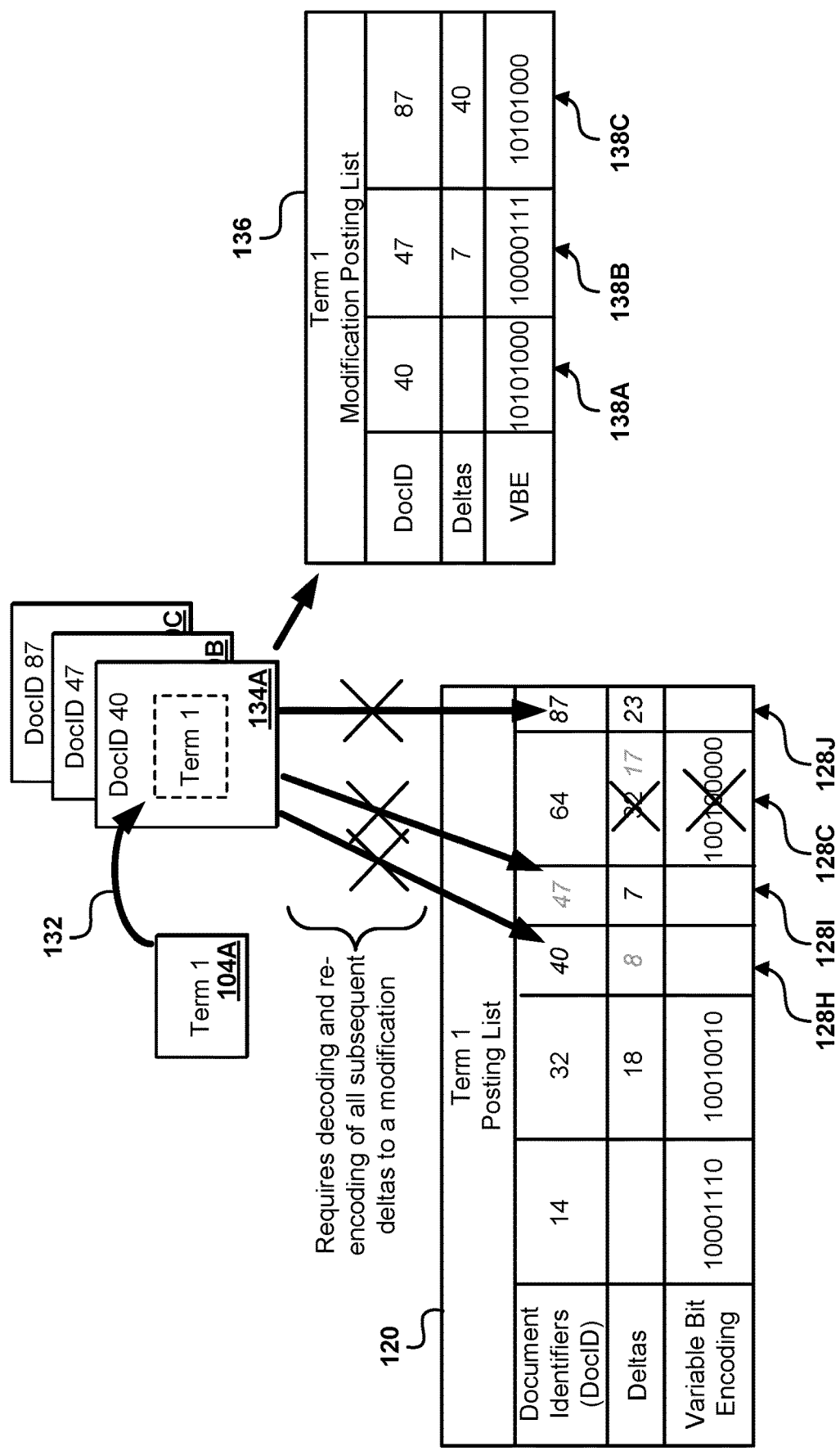

FIG. 1A-1B illustrate existing search processing using variable-width byte encoding of deltas in search processing systems in accordance with various embodiments. FIG. 1A shows an exemplary process for identifying search results 130 related to a search query 116. Search engines use posting lists which index the documents that contain a reference to a particular term to identify relevant documents for a search. The posting lists are encoded compactly because there are a large number of posting lists and the posting lists can take a large amount of space if not encoded. Further, by encoding the posting lists, the scanning of the list can be more efficient and search latency can be decreased.

In the example shown in FIG. 1A, a search query 116 is received that includes a first term 118A and a second term 118B. The search processing system may obtain a first posting list 120 corresponding to the first term 118A and a second posting list 122 corresponding to the second term 118B. However, the posting lists 120, 122 have been encoded using a variable-width byte encoding of document identifier deltas that encodes the differences (also called deltas) between document identifier numbers instead of a full document identifier number. Accordingly, during encoding of the respective posting lists, the full serial number of every document on the posting list is not provided. Instead the documents are processed in order based on sequence number and a difference in the document serial number between adjacent documents (also called a "delta" between documents) are identified and encoded to ensure that fewer bytes are required to identify the same document. For example, a sequence of documents may include the document serial numbers of U.S. Pat. Nos. 1,200,545, 1,200,563, and 1,200,599. If you encoded each of these numbers into a posting list you would need at least 4 bytes to identify each of the document numbers in hexadecimal or binary representations. However, by encoding the difference or delta between document numbers, the system can merely encode the original document serial numbers and then binary numbers 18 (the difference between 1,200,563 and 1,200,545) and 36 (the difference between 1,200,599 and 1,200,563). Accordingly, instead of having repetitive bytes across adjacent documents, each encoded document can be captured in as little as a single byte. The variable-width byte encoding of deltas process saves storage space because the deltas between adjacent document serial numbers are much smaller than the full document number of each document. For example, a full document number usually takes four bytes (e.g., 32 bits of space) while the deltas would typically only use 1 byte (e.g., 8 bits of space) because you only have to store the deltas between documents and most adjacent documents will be within 127 serials (docIDs) of one another.

FIGS. 1A-1B show examples of posting lists with encoded deltas for another set of document identifiers to illustrate the problems associated with real-time altering of encoded posting lists. For example, the posting lists shows three different columns including document identifiers 124, deltas 126, and a variable byte encoding 128. In reality, the posting lists include the variable byte encoding 128 of the delta between document identifiers and the decimal depiction of the document identifiers and deltas are only provided for illustrative purposes. As can be seen, the variable byte encoding 128 of the posting lists encodes the original document serial number of the first document and then encodes the deltas between adjacent documents from that point forward. For example, the difference in document identifier numbers is the delta that is then encoded into binary representations. During decoding, the previous document identifier number is identified and then the delta is added to it to determine each of the documents serial numbers for relevance determinations and providing in a search response.

Further, as can be seen in FIG. 1A, posting list encoding schemes use a variable length byte encoding process where a continuation bit can be provided to indicate whether a byte being read by the decoder is the final byte to identify the document identifier. For example, a single 8 bit byte may be used to identify those documents that are within 127 serials numbers away from one another. The 8 bit byte may include a single continuation bit and 7 payload bits to identify the delta between documents. For instance, a leading bit of each byte may be the continuation bit and if the continuation bit is a "1," the search processor may know that the delta is captured by a single byte. However, if the continuation bit is a "0," the search processor may know that the other 7 bits of the first byte should be added to the 7 bits of the next byte until a continuation bit is read. The continuation bit then indicates that the byte with the continuation bit is the last byte for that encoded delta associated with the document identifier. For example, as can be seen in the variable byte encoding 128F (00000001 10011001), the delta is over 127 (153) so two bytes are necessary to indicate the delta (153) for the document. As can be seen, the first byte of the variable byte encoding 128F has a continuation bit of 0 and the second byte has a continuation bit of 1. Accordingly, the system knows that the first byte is not the end of the delta and will add the 7 payload bits of the first byte (0000001) with the 7 payload bits of the second byte (0011001) for the variable byte encoded document identifier delta (00000010011001) corresponding to 153.

Accordingly, a decoder is configured to identify the continuation bit in each byte of information received and process the byte based on whether the continuation bit indicates the byte is the only byte associated with the encoded delta. The decoder may decode each of the bytes within the posting list and calculate the document identifiers associated with each of the variable length bytes to identify the document identifiers stored within each posting list.

Once the variable length bytes are decoded for each posting list, a set of documents is identified for each of the posting lists that indicate the documents that are associated with each of the terms in the search query. Once the list of document identifiers is obtained, an intersection of those two lists of documents is taken to identify those documents that include both the first term and the second term. For example, if a search query is received for a "red football," a first posting list for "red" and a second posting list for "football" are identified and scanned for documents associated with each of those terms. The encoded document identifiers in each of the posting lists are decoded and the list of document identifiers are compared to identify those documents that are included in both posting lists. For example, FIG. 1A shows that the document 116A having a serial number of 32 has both the first term 118A and the second term 118B. Accordingly, the search results 116 for this example includes document 32. Typically many more results would be obtained and each of the documents could be processed to identify relevance scores for each document, the documents could be ranked according to relevance, and provided to the user as a set of search results.

FIG. 1B shows a modification process where documents have been edited after the posting list was re-generated to include term 1. For example, if an existing document which does not refer to either "red" "football" or "red football" is modified to refer to "red," "football," or "red football," the respective posting lists need to be updated to include the document identifier for the modified document. However, because the posting lists are encoded using deltas between document identifiers in order to save storage space, it is an expensive computational operation to update the posting list as much of the list must be updated and the deltas must be recalculated. Accordingly, it is difficult to insert or delete documents in the posting list once the deltas have been encoded into said posting lists and the posting lists may not be accessible for reading and/or scanning during such updates.

For example, FIG. 1B shows an example where the first term 104A has been added 132 to documents 120A-120C associated with document identifiers 40, 47, and 87. However, attempting to add document identifiers 40 or 47 to the first term posting list 120 would require the encoded deltas within the posting lists to be decoded, recalculated, and edited for every document after a modified document is added or deleted. For example, if either variable byte encodings 128H, 128I for modified documents 40 or 47 are added to the posting list for the first term, the variable byte encoding of the third document would have to be decoded, recalculated based on the difference between the added documents, and re-encoded. This process would have to be reproduced for each of the subsequent variable byte encoded representations within the posting list. Accordingly, the system may as well re-generate a new posting list for the updated documents if such modifications are going to be made. However, because documents may be modified regularly, re-generation or re-processing of posting lists would constantly have to be processed to ensure all documents are included. This can be onerous and wasteful of computing resources and effect the latency of search queries as a posting list cannot be processed while being re-generated.

Instead, typically search processing systems generate an entirely separate index for the changes and modifications to other documents once the original posting list is generated. As such, the posting list is a read-only posting list and will remain outdated but the changes to any documents are accumulated in a second posting list. However, the downside of this approach is that at least two separate look-ups are required to perform a search query. First, the outdated posting list is processed first to obtain a list of documents including the term as of the last time the posting list was generated and then a second or third posting list is referenced to identify the changes to documents that have occurred since the last generated posting list. Accordingly, multiple explicit searches are required for each term which can slow down search processing and lead to search latency for search queries. Accordingly, as shown in FIG. 1B, instead of adding the modified document identifiers to the originally generated posting list associated with the first term, a modification posting list 136 is generated including variable byte encoding representations 138A-138C for the modified documents associated with document identifiers 40, 46, and 86. As can be seen, similar variable byte encoding techniques can be applied for the modification posting list 136 as with the original posting list. However, multiple separate searches will be required for each query term for a search. This can add significant processing delays for search systems with millions or billions of documents and complex search queries.

Figure 2:
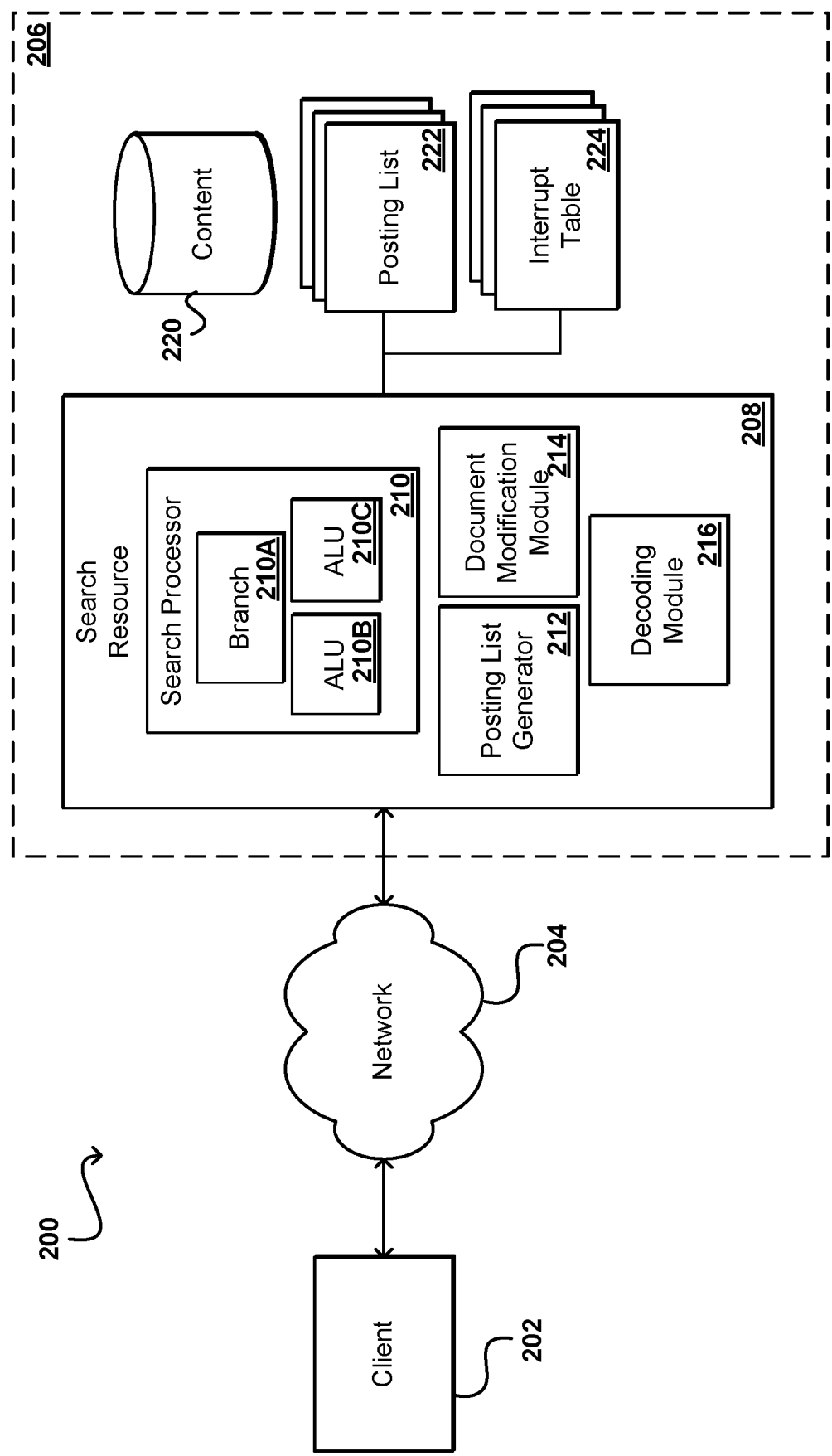
FIG. 2 illustrates an exemplary system for real-time updating of encoded search indexes in accordance with various embodiments.

FIG. 2 illustrates an example system embodiment 200 for a query searching system configured to search data in a networked environment in accordance with various embodiments. A client device 202 is configured to submit a search query across at least one network 204 (e.g., the Internet, an intranet, a cellular network, a local area network, etc.) to be delivered to a resource environment 206, as may be used to provide a data search service among other such offerings. At least one search resource 208, such as a search server configured with appropriate search instructions, can compare keywords or other portions of the query against entries in a posting list 222, where the posting list relates to data and/or content stored in at least one content repository 220 or other such data store. The posting list 222 can be generated for the data and/or content using any appropriate indexing approach known or used for such purposes. The search resource can perform tasks such as to locate matches for the keywords from the posting list 222 as described herein, determine relevance scores for the matches, and select a portion of the matches as search results based at least in part upon the respective relevancy scores. The search results can include, or at least point to, corresponding content (also referred to as documents) stored in the content repository 220.

The example search resource 208 can comprise a search processor 210, a posting list generator 212, a posting list modification module 214, and a decoding module 216. It is contemplated that the various components and/or portions of the example system 200 can be implemented as hardware, software, or a combination of both. For example, the various parts of the system 200 can be implemented via a circuit, a processor, an application, a portion of programming code, an algorithm, or any combination thereof, etc. It is also contemplated FIG. 2 is an example and meant to be used for illustrative purposes only. For example, the various components do not have to be configured according to FIG. 2. In some embodiments, the various components do not have to be tightly coupled to one another and can instead be spread across a more distributed system. For example, a component can reside on a separate/different network and/or system, but still retain a communicative connection(s) to the other components.

The search resource may also include a content database 220, posting lists 222, and interrupt tables 224 associated with the posting lists 222. As explained above, each posting list 222 may be associated with a particular term and the posting list 222 includes a list of encoded deltas between adjacent document numbers. The posting list 222 may be stored in a vector array or other memory accessible by the search processor 210. The posting list 222 may be cached and/or loaded from a separate memory. The interrupt tables 224 may be stored in a parallel vector arrays or other suitable memory to the posting lists 222. The interrupt tables are accessible by the search processor 210 and have corresponding location references between the posting lists 222 and the interrupt tables 224. For example, the location references within the interrupt tables 224 may be associated with a byte location of the interrupt flag within the posting lists 222. For example, if byte 14 of the posting list includes an interrupt indicator, the interrupt table may include a reference to byte 14 of the posting list to find the modification delta and the resume delta associated with the interrupt indicator. Accordingly, the interrupt table 224 may be significantly smaller than the corresponding posting list 222 since fewer modifications may exist than original documents associated with a term. The interrupt table 224 may be organized sequentially similar to the posting list 222. However, the interrupt table 224 may be organized by interrupts such that it is only referenced when the interrupt condition is triggered.

The search processor 210 may include at least three processing units, a branch unit 210A configured to direct computational resources and two or more arithmetic logic units (ALU) 210B, 210C configured to perform computations directed by the branch unit 210A. The three semi-independent units may operate simultaneously to perform different functionality. The two ALU units 210B, 210C perform computation and the branch unit 210A makes decisions about where the computational units should process information next. The standard decoding technique uses only one of the ALU units during decoding of the posting list 222, leaving an ALU unit and the branch unit idle. The search processor can facilitate the system to perform various operations for generating, encoding, decoding, and searching posting lists for query results associated with a search query in a networked environment. Any suitable processor may be used as a search processor including general purpose processors, ASICs, or application-specific processors.

The search system processes posting lists by scanning them incrementally from low document identifier to higher document identifier decoding the encoded representation of the delta for each document identifier. While scanning there is a slack time available in the processor 210 to do processing other than standard decoding. For example, the branch unit 210A may be available while one of the ALU units 210B is decoding the document identifiers. In some embodiments, the slack time can be used to effectively insert or delete items in the posting list 222 using an interrupt table using the available branch unit 210A and the idle ALU unit 210C that is not decoding the encoded representation of the delta for each of the document identifiers. The slack time arises from the standard decoding algorithm that has a step where a processor is only using one of the three internal units of the processor. The other two units are idle and can be used to make an edit and read the edit within an interrupt table. Accordingly, embodiments use existing unused processing resources (e.g., the slack time) of a processing chip to obtain modified document information from an interrupt table and include the modified document information in the results of decoded document representations. For example, the idle processing units may be configured to identify an interrupt indicator and obtain the modified encoded document identifiers such that identifying the interrupt indicator does not slow processing time of decoding the encoded document identifiers.

For example, the search processor is configured to implement an encoding process that uses an interrupt byte (e.g., leading byte value of 0) that includes a continuation bit (e.g., a redundant leading 0 in base 128 position notation) that indicates that although it appears the byte is instructing the system to accumulate additional bits for an encoded delta, the byte value triggers the search processor to lookup an interrupt table instead. The key constraint on the processing resources is that only one conditional branch instruction can be executed at a time, and its execution chooses among one of two outcomes: (1) falling through to the next physically sequential instruction without taking the branch, or (2) taking the branch and transferring control to a physically non-sequential instruction. In contrast, the processing of the bytes in the scanning loop by the ALU has 3 logical outcomes: (1) identifying an interrupt signal, (2) determining the present byte is the last byte of an encoded delta, or (3) determining the present byte is not the last byte of an encoded delta. Therefore, the general decision mechanism which allows for all 3 outcomes must take at least 2 cycles. Also, the frequency distribution of the choices may be highly skewed because as observed in practice, the most common case is a delta of at most 127 encoded in 1 byte. Accordingly, by encoding an interrupt byte using a bit that can be processed without requiring an additional cycle for the most common case (e.g., no continuation bit as each entry in the posting list is less than 127 document identifiers away from the previous document identifier) the system saves a cycle in the most common scenario and processes the posting lists more efficiently while allowing modifications to the posting list.

For instance, the search processor may be configured to scan for a delta by performing the following process. First, a byte is fetched by the search processor. Next, the search processor examines the byte and checks for an "encoding stops here" condition where the byte does not include a continuation bit. At the same time, the search processor checks the byte for an interrupt condition where all 7 payload bits are equal to zero. If the search processor determines that no continuation bytes are present, the search processor determines the delta is equal to the 7 payload bits. The search processor specifically does not detect whether an interrupt byte is present at this point in order to conserve a processing cycle of the search processor. As such, since the most common case in the posting list is a delta of 127 or less, the most common case will be completed at this point and the search processor can obtain the next byte and move through the posting list without performing further processing. Thus, most cases may be performed in three processor cycles (fetch byte, identify if continuation byte is present, and determine whether payload bits are equal to 0).

If a continuation byte is present, the search processor continues processing the encoded byte, knowing that a delta of 127 or less already has been segregated and the search processor fetches the second byte while at the same time using the idle branch unit to branch if the payload from the first byte indicates that an interrupt flag is present (e.g., 7 payload bits equal to 0). Thus, the branching unit can shift to read the interrupt table associated with the interrupt flag while leveraging idle processing resources by the search processor. If the payload bits do not indicate an interrupt condition/flag, the search processor does not branch and instead continues to process the next byte in order to determine the encoded delta as indicated by the continuation bit since the delta is greater than 127. Thus, embodiments use an interrupt byte that has a continuation bit which instructs the search processor to "continue accumulating the bits for a delta>127", together with 7 payload bits of 0, which say "this is an interrupt, so stop and shift to interrupt table." Thus, by encoding an interrupt byte using a "do continue" bit enables no extra cycle for the most common case of the first step: "no continuation: delta<=127". Accordingly, the encoding techniques provide the ability to detect an interrupt while having no speed penalty for not detecting an interrupt.

The posting list generator 212 can generate posting lists 222 for the data in the content repository 220. A variety of different posting lists 222 can be generated where each posting list is generated for each of the terms found in the documents in the content repository 220. Together or individually the posting lists 222 may also be referred to as an index or search index. The data and the search index generated for the data can be stored on one or more storage allocations. The posting list generator 212 may search a plurality of documents in at least one datastore for each term within documents stored within the content repository 220 and may determine a set of documents of the plurality of documents that include the term. The posting list generator 212 may identify a document identifier for each of the set of documents, sort the set of document in a sequence according to each document identifier of the set of document identifiers, determine a delta between document identifiers for adjacent documents for each of the document identifiers in the sequence, and encode a document identifier for the first document in the sequence and encoding the delta for each of the set of documents.

The document modification module 214 may include any suitable software module for identifying documents that have been modified since the last posting list 222 was generated and updating posting lists with the modified documents. For example, the document modification module may be configured to determine that a document in the plurality of documents has been modified in relation to the term after the search engine posting list 222 was generated and determine the document identifier associated with the modified document. The modifications may include additions of a term to a document or removing a term from a document. Once the document modification is identified, the document modification module may determine a modified document location within the search engine posting list 222, overwrite the encoded document identifier at the modified document location within the search engine posting list 222 with an interrupt indicator, and insert modified encoded document identifiers to an interrupt table associated with the modified document identifier location. Additional details related to the modified encoded document identifiers may be found below in reference to FIGS. 3A-3D.

The decoding module 216 may include any suitable software module for decoding posting lists 222 in order to identify document identifiers associated with each term associated with a posting list 222. Embodiments may be configured to interface with an interrupt table during decoding to allow for real-time editing of posting lists with modified document information that has been added to interrupt tables. Accordingly, the decoding module 216 may be configured to receive a query including the term and scan the search engine posting list 222 for encoded document identifiers. Each of the encoded document identifiers may correspond to a difference between adjacent document identifiers in a posting list 222. The decoding module 216 may identify the interrupt indicator as one of the scanned encoded document identifiers, determine a location of the interrupt indicator within the search engine posting list 222, obtain the modified encoded document identifiers from the interrupt table using the location of the interrupt indicator, and decode the modified encoded document identifiers to determine the document identifiers associated with the modified encoded document identifiers. Accordingly, the decoding module 216 may insert the document identifiers associated with the modified encoded document identifiers to a set of decoded document identifiers associated with the query. The search system may also provide document information associated with the set of decoded document identifiers in response to the query.

Additional details regarding the operation of embodiments may be obtained in reference to FIGS. 3A-3D which provide an example of the operation of embodiments incorporating interrupt indicators and the interrupt table in order to allow real-time modifications of posting lists and/or search indexes. FIGS. 3A-3D illustrates an exemplary process 300A-300D of performing real-time updating and reading of encoded posting lists for modified documents in accordance with various embodiments. FIGS. 3A-3D provide an example of a posting list for a first term where a document is modified to insert a term after a posting list has been generated. Accordingly, a document associated with the document identifier 40 is modified to include a first term after the posting list has been generated. FIG. 3A shows a first view of a posting list associated with the first term that is similar to the posting lists described in FIGS. 1A-1B. The posting list shows four entries with encoded document identifiers corresponding to DocIDs 14, 32, 64, and 84.

However, upon the modified document corresponding to DocID 40 being modified to include term 1, step 310 of FIGS. 3A and 3B show the updating of the posting list to include an interrupt flag 328E. The interrupt flag (also referred to as an interrupt indicator or marker) indicates the interrupt table associated with the posting list should be addressed to identify the modified document identifier. Accordingly, as shown in FIG. 3B, the encoded variable byte associated with the document that is larger than but closest to the document identifier associated with the modified document (e.g., DocID 40) is identified. In this example, that is the encoded document identifier 328C associated with DocID 64 as it is between document identifier 32 and the modified document identifier 40. Thus, the processor identifies the document overwriting of an encoded document identifier associated with a document between the document 32 and 64 and overwrites the variable byte encoded value 328C to correspond to an interrupt flag 328E. The interrupt flag 328E may be 0 such that the processor may easily identify the interrupt indicator as a delta of 0 does not identify a new document. Instead, using the variable byte encoding scheme based on differences between document identifiers, it identifies the same document that was just decoded (since the delta between documents is 0). Accordingly, the processor may identify that the delta associated with the encoded document identifier does not make sense and an interrupt table should be referenced to identify the relevant encoded document identifiers.

FIG. 3C illustrates the processor obtaining modified encoded document identifiers from an interrupt table. As shown in step 320, the processor may reference the interrupt table 306 associated with the posting list 302. Further, the processor knows which byte was processed when finding the interrupt indicator 328E. Accordingly, a location of the interrupt indicator may be used to identify the specific modified encoded document identifier that should be obtained from the interrupt table 306. For example, in this case, the interrupt indicator was found in the third byte processed by the decoder of the search system. Accordingly, the interrupt table may be referenced with the location of byte 3 to identify the corresponding modified encoded document identifiers associated with the interrupt indicator 328E. Although not shown, the interrupt table may include modified encoded document identifiers associated with a large number of modified documents so the location may be used as a search reference in order to identify the correct encoded document identifier associated with the interrupt indicator.

Moreover, the branch processing unit of the processor is idle when the interrupt indicator is received and the branching unit can be used to change the memory from which the processor obtains the information. As described above in reference to FIG. 2, the search processor is configured to implement an encoding technique that uses the idle branching unit and the ALU processing units to ensure that the most common case of a document identifier delta being less than 127 document identifiers from the next document identifier is processed in a minimal number of processing cycles. Further, if the most common case is not present, and a continuation byte is present, the search processor continues processing the encoded byte, knowing that a delta of 127 or less already has been segregated and the search processor fetches the second byte while at the same time using the idle branch unit to branch if the payload from the first byte indicates that an interrupt flag is present (e.g., 7 payload bits equal to 0). Thus, the branching unit can shift to read the interrupt table associated with the interrupt flag while leveraging idle processing resources by the search processor. If the payload bits do not indicate an interrupt condition/flag, the search processor does not branch and instead continues to process the next byte in order to determine the encoded delta as indicated by the continuation bit since the delta is greater than 127. Accordingly, embodiments take advantage of idle resources which are available at no cost and determine that the interrupt table should be identified and obtain bytes from the interrupt table associated with the present location of the posting list can be had without causing delay or extra processing cycles by processors with multiple processing units. Thus, the search processor can obtain the modification information from the interrupt table and determine whether the modification information is associated with an insertion, deletion, or other action based on the received bytes read from the interrupt table.

The interrupt table may be organized and encoded using the same techniques as described above for the posting list such that the processor can process the encoded document identifiers in the same manner in order to identify the document identifier associated with the modified documents. Accordingly, the interrupt table allows the search system to store information in the interrupt table and use the information to identify modified document identifier information as if it were present in the posting list. For example, as shown in the example of FIGS. 3A-3C, instead of receiving bytes associated with a delta of 32 (the difference between DocIDs 32 and 64), the processor can receive an encoded document identifier associated with a delta of 8 (the difference between document 32 and 40). Accordingly, a byte associated with document 40 has been received by the decoder as if the encoded byte was present in the posting list from the beginning. This delta may be referred to as a modification delta 336A since it identifies the modified delta. As such, the search system may obtain the encoded delta associated with the manipulated document instead of the previous encoded delta in the posting list before the overwriting occurred with the interrupt indicator.

Further, the next byte read by the processor from the interrupt table includes a resume delta 336B that identifies the originally altered encoded document identifier that was overwritten. For instance, the resume delta in the example provided in FIG. 3C corresponds to a delta of 24 (the difference between the newly inserted modified document DocID 40 and the previously encoded document identifier found in the posting list before being overwritten with the interrupt indicator with DocID 64). Put another way, the modification delta is determined by a difference between the modified document identifier and the previously decoded document identifier and the resume delta is determined by a difference between the modified document identifier and the document identifier of the overwritten entry in the original posting list.

As shown at step 330, once the modified delta information is obtained, the search processor references back to the next byte of the posting list. Accordingly, the search processor may have three pieces of information upon reading the interrupt table: (1) the new modified encoded delta (e.g., the delta 8), the resume delta (e.g., the delta 24), and a continuation point for the posting list (e.g., byte 4—the next byte from the location of the modified document identifier). The exception table may store this information in a minimal number of bytes and can be processed in the same manner as the regular table as described herein.

FIG. 3D illustrates the search results incorporating the modified document identifier 334A (e.g., 40) as well as the overwritten document identifier 334B (e.g., 64) that was changed to the interrupt identifier as obtained and decoded from the interrupt table 306. Accordingly, using embodiments of the present techniques, the system is capable of obtaining modified document identifiers for an extra couple processing cycles compared to the cost of scanning a document. However, for those couple extra processing cycles, the system is able to effectively modify a document into the posting list and avoid having to perform an additional search for changes to documents as traditionally necessary.

Although embodiments described herein focus on 8 bits per byte and particular variable-width byte encoding of delta algorithms, any suitable bit sized bytes and/or encoding algorithms may be used in embodiments. Accordingly, the different algorithms can be implemented to accomplish the same functionality and performance advantages using a different specific encoding algorithm of the posting list. For example, 64 bit processors and additional memory configurations could be implemented using directly addressable random access memory. Further, another technique could use 10 bits to encode one delta where 8 bits are used for the magnitude of a delta and 2 bits could be used to indicate the magnitude is represented in 1 byte, 2 bytes, 3 bytes, or 4 bytes. Accordingly, you could have a constant overhead of 2 bits per byte in this embodiment.

Figure 4:
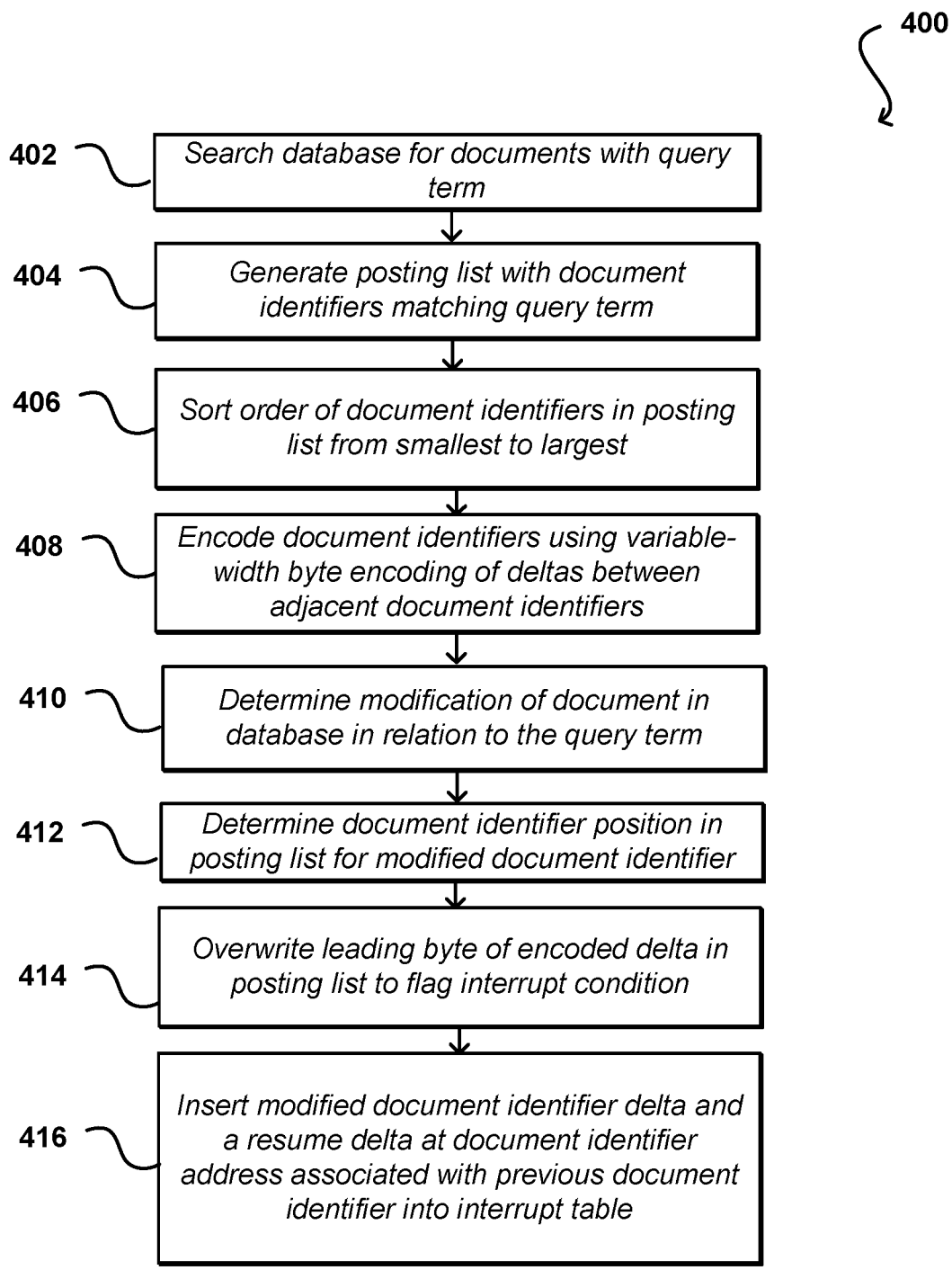
FIG. 4 illustrates an example process for generating and editing posting lists using variable-width byte encoding of document identifier deltas to incorporate modifications to documents in real-time that can be utilized in accordance with various embodiments.

FIG. 4 illustrates an example process 400 for generating and editing posting lists using variable-width byte encoding of document identifier deltas techniques to incorporate modifications to documents in real-time that can be utilized in accordance with various embodiments. A search engine may search 402 one or more databases for documents associated with a term. The search engine may generate 404 a posting list with document identifiers for documents including the term. The search engine may sort 406 the order of document identifiers in the generated posting list from small to large. The search engine may encode 408 the document identifies using variable-width byte encoding of deltas between the document identifier numbers of adjacent document identifiers in the posting list. The search engine may determine 410 a document is modified in relation to the term after the posting list has been generated. The document identifier position in the posting list may be determined 412 for the document identifier associated with the modified document. The leading byte of the encoded delta associated with the document identifier position may be overwritten 414 to flag an interrupt condition. Finally, modified document identifier information may be inserted 416 into an interrupt table corresponding to the document identifier position in the posting list for use upon an interrupt condition being met. The modified document identifier information may include a modified document identifier delta and a resume delta. Accordingly, the posting list may be updated to incorporate modified document deltas that can be used to identify document identifiers associated with modified documents within a single search of a parallel memory of the posting list.

Figure 5:
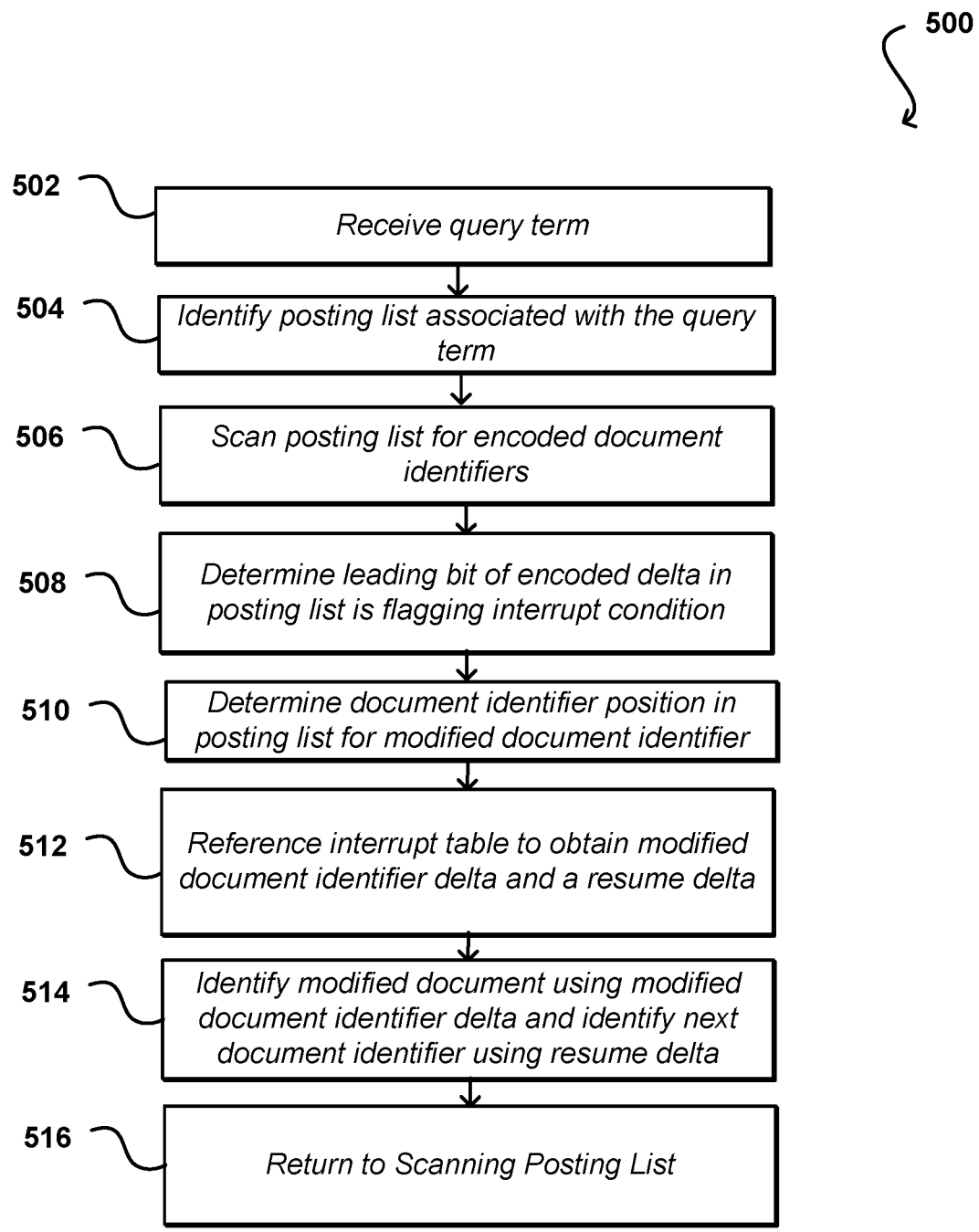
FIG. 5 illustrates an example process for reading modified encoded posting lists in real-time that can be utilized in accordance with various embodiments.

FIG. 5 illustrates an example process 500 for reading modified encoded posting lists in real-time that can be utilized in accordance with various embodiments. A search system may receive 502 a query term and identify 504 a posting list associated with the query term. The posting list may be scanned 506 for encoded document identifiers. Each of the encoded document identifiers may correspond to a difference between adjacent document identifiers. An interrupt indicator or interrupt condition may be determined 508 as a scanned encoded document identifier and a location of the interrupt indicator within the search engine posting list may be determined 510. The interrupt table may be referenced 512 to obtain the modified encoded document identifiers using the location of the interrupt indicator. The modified encoded document identifiers may include a modified delta and a resume delta to identify the modified document and the overwritten original document identifier that has not been modified. A document identifier associated with the modified document may be identified 514 using the modified delta and the next document identifier may be identified using the resume delta. The deltas may be decoded and the document identifiers may be included in a set of decoded document identifiers associated with the query. The scan may return 516 to the posting list and continue scanning until completed.

Figure 6:
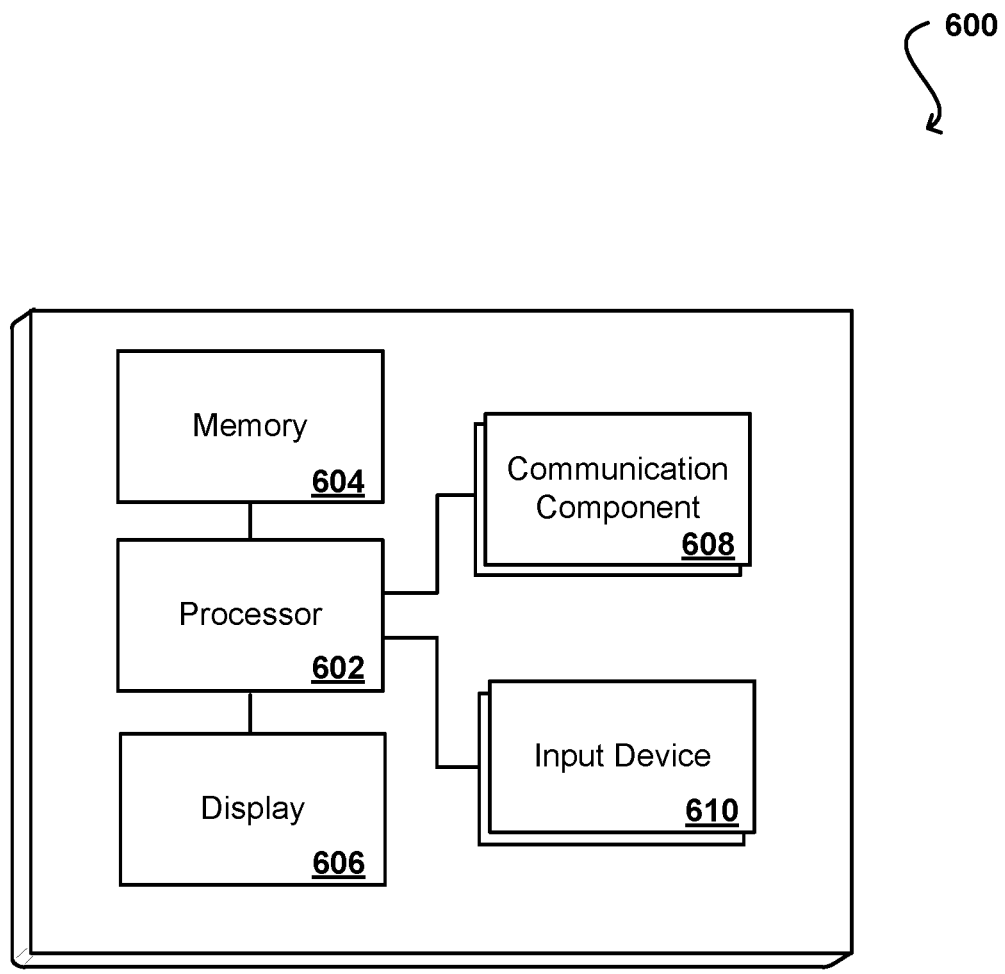
FIG. 6 illustrates example components of a computing device that can be utilized in accordance with various embodiments.

FIG. 6 illustrates a logical arrangement of a set of general components of an example computing device 600 that can be used to implement aspects of the various embodiments. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
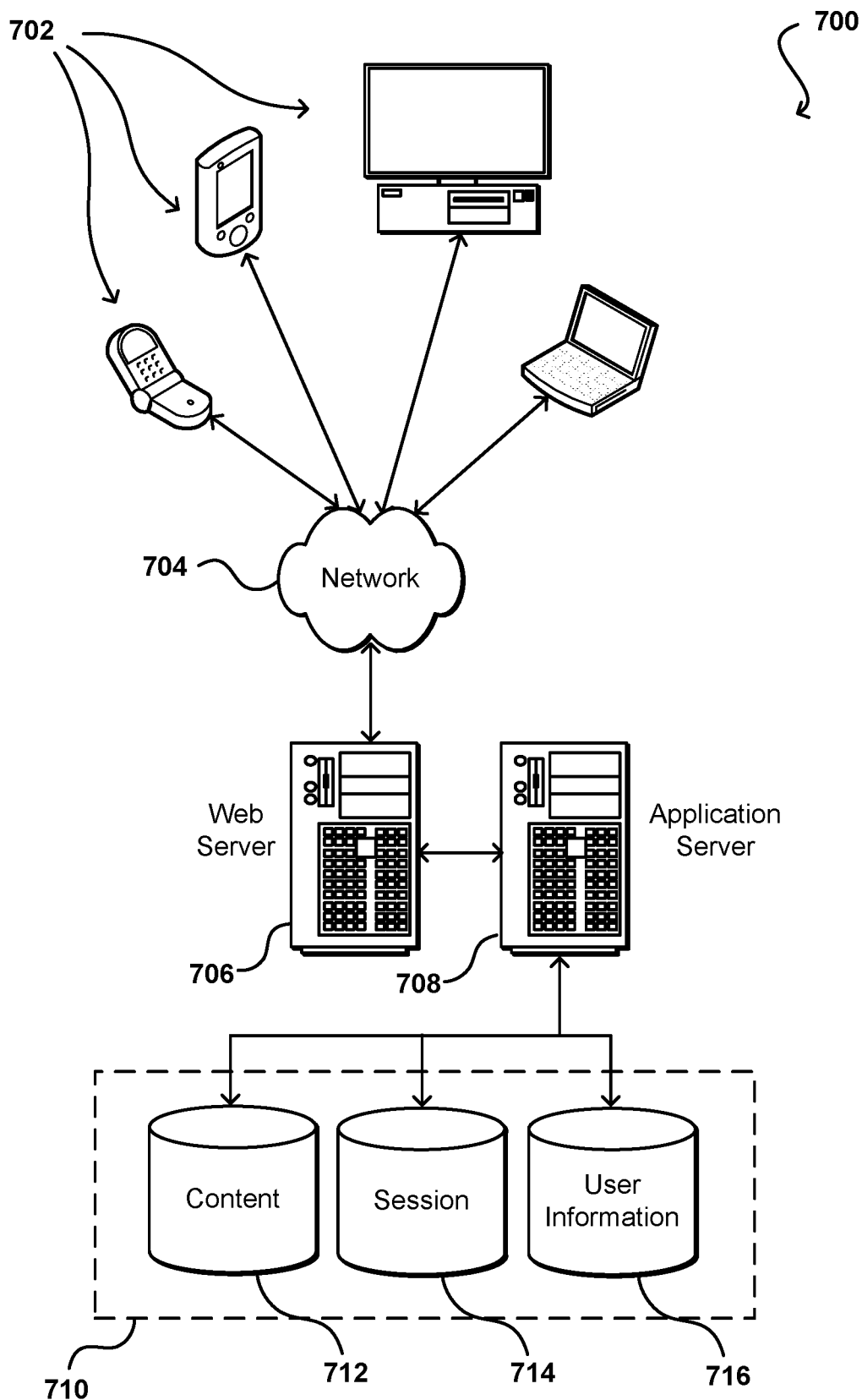
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. The system includes an electronic client device 702. Client devices used to interact with various embodiments can include any appropriate device operable to send and receive requests, messages, or information over an appropriate network 704 and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

A data store 710 can include several separate data tables, databases, or other data storage mechanisms and media for storing data relating to a particular aspect. For example, the data store illustrated includes mechanisms for storing production data 712 and user information 716 which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described in FIG. 7. Thus, the depictions of the system 700 in FIG. 7 should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A search system configured to decode variable-width byte encoded document identifiers for a search engine posting list comprising:
    at least one search processor; and
    memory storing that, when executed by the at least one search processor, cause the system to:
        generate the search engine posting list for a term, the search engine posting list including a set of encoded document identifiers corresponding to a set of documents including the term;
        determine that a document in the plurality of documents has been modified in relation to the term after the search engine posting list was generated;
        determine the document identifier associated with the modified document;
        determine a modified document location within the search engine posting list;
        overwrite the encoded document identifier at the modified document location within the search engine posting list with an interrupt indicator;
        insert modified encoded document identifiers to an interrupt table associated with the modified document identifier location;
        receive a query including the term;
        scan the search engine posting list for encoded document identifiers, each of the encoded document identifiers corresponding to a difference between adjacent document identifiers;
        identify the interrupt indicator as one of the scanned encoded document identifiers;
        determine a location of the interrupt indicator within the search engine posting list;
        obtain the modified encoded document identifiers from the interrupt table using the location of the interrupt indicator;
        decode the modified encoded document identifiers to determine the document identifiers associated with the modified encoded document identifiers;
        insert the document identifiers associated with the modified encoded document identifiers to a set of decoded document identifiers associated with the query; and
        provide document information associated with the set of decoded document identifiers in response to the query.

2. The search system of claim 1, wherein the at least one search processor further comprises:
    a branch processing unit; and
    at least two ALU processing units, wherein during scanning of the search engine posting list, the branch processing unit and an ALU processing unit of the at least two ALU processing units are idle, and wherein identifying the interrupt indicator and obtaining the modified encoded document identifiers are performed by the idle processing units such that identifying the interrupt indicator does not slow processing time of decoding the encoded document identifiers.

3. The search system of claim 1, wherein determining a modified document location within the search engine posting list further comprises:
    scanning the search engine posting list for a first encoded document identifier that has a document identifier that is larger than the document identifier associated with the modified document; and
    determining a byte position for the first encoded document identifier within the search engine posting list.

4. The search system of claim 1, wherein identifying the interrupt indicator as one of the scanned encoded document identifiers further comprises:
    receiving each of the scanned encoded document identifiers;
    comparing each of the scanned encoded document identifiers to a delta value of 0; and
    determining that one of the encoded document identifiers is equal to zero.

5. The search system of claim 1, wherein generating the search engine posting list further comprises:
    searching a plurality of documents in at least one datastore for the term;
    determining a set of documents of the plurality of documents that include the term;
    identifying a document identifier for each of the set of documents;
    sorting the set of document in a sequence according to each document identifier of the set of document identifiers;
    determining a delta between document identifiers for adjacent documents for each of the document identifiers in the sequence; and
    encoding a document identifier for the first document in the sequence and encoding the delta for each of the set of documents, the encoding being performed using a variable-width byte encoding.

6. A computer-implemented method, comprising:
    determining a posting list associated with a query term;
    scanning the posting list for encoded document identifiers associated with the term, the encoded document identifiers being encoded using document identifier deltas between adjacent document identifiers in the posting list;

identifying an interrupt indicator in the encoded document identifier;

obtaining modified document identifier information from an interrupt table, the modified document identifier information including at least one encoded document identifier associated with a modified document associated with the query term;

determining a set of decoded document identifiers including the term; and providing search results including at least a subset of documents associated with the set of decoded document identifiers.

7. The computer-implemented method of claim 6, wherein determining a set of decoded document identifiers including the term further comprises:

decoding each of the encoded document identifiers to obtain a delta between each of the adjacent document identifiers in the posting list; and determining a document identifier number associated with each of the decoded document identifiers based on the document identifier associated with an adjacent decoded document identifier and the delta.

8. The computer-implemented method of claim 6, wherein identifying an interrupt indicator in the encoded document identifier further comprises:

receiving each of the scanned encoded document identifiers;

comparing each of the scanned encoded document identifiers to a delta value of 0; and determining that an encoded document identifier of the encoded document identifiers is equal to zero.

9. The computer-implemented method of claim 6, wherein obtaining the modified document identifier information from the interrupt table further comprises:

determining a location of the interrupt indicator within the posting list; and obtaining the modified encoded document identifiers from the interrupt table using the location of the interrupt indicator.

10. The computer-implemented method of claim 9, wherein the location of the interrupt indicator includes a byte position for the interrupt indicator within the posting list.

11. The computer-implemented method of claim 9, wherein the modified document identifier information includes an encoded modification delta and an encoded resume delta.

12. The computer-implemented method of claim 11, wherein the encoded modification delta includes a delta between the last scanned document identifier and the modified document identifier, and wherein the encoded resume delta includes a delta between the modified document identifier and the next encoded document identifier in the posting list.

13. The computer-implemented method of claim 6, further comprising:

determining that a document in the plurality of documents has been modified in relation to the term after the search engine posting list was generated;

determining the document identifier associated with the modified document;

determining a modified document location within the search engine posting list;

overwriting the encoded document identifier at the modified document location within the search engine posting list with an interrupt indicator; and adding modified encoded document identifiers to an interrupt table associated with the modified document identifier location.

14. The computer-implemented method of claim 13, wherein the modification includes an insertion of the term in the document or a deletion of the term from the document.

15. A system, comprising:

at least one search processor; and memory storing instructions that, when executed by the at least one search processor, cause the system to:

determine a posting list associated with a query term;

scan the posting list for encoded document identifiers associated with the term, the encoded document identifiers being encoded document identifier deltas between adjacent document identifiers in the posting list;

identify an interrupt indicator in the encoded document identifier;

obtain modified document identifier information from an interrupt table, the modified document identifier information including at least one encoded document identifier associated with a modified document associated with the query term;

determine a set of decoded document identifiers including the term; and provide search results including at least a subset of documents associated with the set of decoded document identifiers.

16. The system of claim 15, wherein identifying an interrupt indicator in the encoded document identifier further comprises:

receive each of the scanned encoded document identifiers;

compare each of the scanned encoded document identifiers to a delta value of 0; and determine that an encoded document identifier of the encoded document identifiers is equal to zero.

17. The system of claim 16, wherein obtaining the modified document identifier information from the interrupt table further comprises:

determining a location of the interrupt indicator within the posting list; and obtaining the modified encoded document identifiers from the interrupt table using the location of the interrupt indicator.

18. The system of claim 17, wherein the location of the interrupt indicator includes a byte position for the interrupt indicator within the posting list.

19. The system of claim 17, wherein the modified document identifier information includes an encoded modification delta and an encoded resume delta, the encoded modification delta includes a delta between the last scanned document identifier and the modified document identifier, and wherein the encoded resume delta includes a delta between the modified document identifier and the next encoded document identifier in the posting list.

20. The system of claim 15, wherein determining a set of decoded document identifiers including the term further comprises:

decoding each of the encoded document identifiers to obtain a delta between each of the adjacent document identifiers in the posting list; and determining a document identifier number associated with each of the decoded document identifiers based on the document identifier associated with an adjacent decoded document identifier and the delta.

* * * * *